United States Patent
Zhu

(10) Patent No.: US 10,812,194 B2
(45) Date of Patent: Oct. 20, 2020

(54) INFORMATION TRANSMITTING DEVICE FOR OPTICAL COMMUNICATION, OPTICAL COMMUNICATION METHOD AND OPTICAL COMMUNICATION SYSTEM

(71) Applicant: BOE TECHNOLOGY GROUP CO., LTD., Beijing (CN)

(72) Inventor: Lin Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/456,326

(22) Filed: Jun. 28, 2019

(65) Prior Publication Data
US 2020/0036448 A1 Jan. 30, 2020

(30) Foreign Application Priority Data
Jul. 27, 2018 (CN) .......................... 2018 1 0844290

(51) Int. Cl.
*H04B 10/50* (2013.01)
*H05B 45/10* (2020.01)
(Continued)

(52) U.S. Cl.
CPC ...... *H04B 10/502* (2013.01); *H04W 52/0261* (2013.01); *H05B 45/10* (2020.01); *H05B 47/105* (2020.01)

(58) Field of Classification Search
None
See application file for complete search history.

(56) References Cited

U.S. PATENT DOCUMENTS 5,822,099 A * 10/1998 Takamatsu ......... H04B 10/1127
398/162
2004/0161246 A1* 8/2004 Matsushita ............. G06F 3/002
398/187
(Continued)

FOREIGN PATENT DOCUMENTS

| CN | 102264175 A | 11/2011 |
| CN | 102843191 A | 12/2012 |
| CN | 107682083 A | 2/2018 |

OTHER PUBLICATIONS

Office action dated May 6, 2020 for application No. CN201810844290.6 with English translation attached.

*Primary Examiner* — David W Lambert
(74) *Attorney, Agent, or Firm* — Nath, Goldberg & Meyer; Joshua B. Goldberg; Stephanie F. Majkut

(57) ABSTRACT

The present disclosure provides an information transmitting device for optical communication, an optical communication method and an optical communication system. The information transmitting device includes: a distance sensor, configured to detect a distance from the information transmitting device to an information receiving device; a light emitting element, configured to issue an optical signal to the information receiving device, the optical signal including an optical communication information; a controller electrically coupled to the distance sensor and the light emitting element respectively, configured to adjust a light emitting mode of the light emitting element according to the distance detected, so that an intensity of the optical signal received by a light sensor of the information receiving device is greater than or equal to a start-up light intensity of the light sensor, thereby the light sensor can sense the optical signal at a rated resolution.

12 Claims, 5 Drawing Sheets

(51) Int. Cl.
   *H05B 47/105* (2020.01)
   *H04W 52/02* (2009.01)

(56) References Cited

U.S. PATENT DOCUMENTS

2011/0291585 A1  12/2011  Foo
2013/0279919 A1  10/2013  Yokoi

\* cited by examiner

INFORMATION TRANSMITTING DEVICE FOR OPTICAL COMMUNICATION, OPTICAL COMMUNICATION METHOD AND OPTICAL COMMUNICATION SYSTEM

CROSS-REFERENCE TO RELATED APPLICATIONS

The present application claims the priority of Chinese Patent Application No. 201810844290.6, filed on Jul. 27, 2018, and entitled "information transmitting device for optical communication, optical communication method and optical communication system", the contents of which are incorporated herein in their entirety by reference.

TECHNICAL FIELD

The present disclosure relates to the field of optical communication technology, and in particular, to an information transmitting device, an optical communication system including the information transmitting device, and an optical communication method.

BACKGROUND

An optical communication system generally includes an information transmitting device and an information receiving device for optical communication.

The information transmitting device is generally a mobile device with certain mobility, such as a smart phone, a tablet computer. A power of the mobile device is limited by a capacity of a battery, and with an increasing of a power consumption of software (including operating system and various applications) of the mobile device, the electricity of the battery to power the mobile device is often insufficient. For optical communication, in order to ensure that the information receiving device can receive and clearly identify effective information from an optical signal transmitted by the information transmitting device, it requires the information transmitting device to transmit the optical signal with certain intensity or above. However, when the electricity of the battery to power the mobile device is insufficient, it cannot ensure that the information transmitting device can transmit the optical signal with certain intensity or above, thus the optical communication may be difficult to be achieved. In addition, the optical communication further aggravates the power consumption of the mobile device, which may lead to subsequent unavailability of the mobile device.

SUMMARY

An embodiment of the present disclosure provides an information transmitting device for optical communication, including: a distance sensor, configured to detect a distance from the information transmitting device to an information receiving device; a light emitting element, configured to issue an optical signal to the information receiving device, the optical signal including an optical communication information; a controller electrically coupled to the distance sensor and the light emitting element respectively, configured to adjust a light emitting mode of the light emitting element according to the distance detected, so that an intensity of the optical signal received by a light sensor of the information receiving device is greater than or equal to a start-up light intensity of the light sensor, thereby the light sensor can sense the optical signal at a rated resolution.

In some implementations, the light emitting element includes a single light emitting part, and adjusting the light emitting mode of the light emitting element includes adjusting a brightness of the light emitting part.

In some implementations, the light emitting element includes a plurality of light emitting parts, the controller is configured to: judging whether the distance detected is greater than a threshold within a stable light intensity sensing range of the light sensor, the stable light intensity sensing range indicating a distance range in which the light sensor can sense a light intensity stably; in response to the distance detected being greater than the threshold, adjust a brightness of each of the light emitting parts and/or a number of light emitting parts emitting light among the plurality of light emitting parts according to the distance detected, so that the intensity of the optical signal received by the light sensor is greater than or equal to, but approaches the start-up light intensity of the light sensor; and in response to the distance detected being less than or equal to the threshold, control the plurality of light emitting parts issue the optical signal in a time-divisional mode.

In some implementations, the controller includes a driving circuit configured to drive the light emitting element to emit light and a micro-controller configured to transmit a control signal to the driving circuit, the micro-controller is configured to: acquire an optical communication data frame including a data body and a distance estimating bit, the distance estimating bit indicating the distance detected; retrieve the light emitting mode from a list according to the distance estimating bit; and generate the control signal according to the light emitting mode retrieved and the data body so that the optical signal issued by the light emitting element includes the data body.

In some implementations, the data body includes identification information of the information transmitting device.

In some implementations, the light emitting element includes a light emitting diode.

In some implementations, the light emitting element and the light sensor are corresponding one by one.

In some implementations, the information transmitting device includes a mobile device, and the light emitting element includes a flashing light of the mobile device.

An embodiment of the present disclosure provides an optical communication method for optical communication between an information transmitting device and an information receiving device, the method includes: detecting a distance from the information transmitting device to the information receiving device; adjusting a light emitting mode of a light emitting element of the information transmitting device according the distance detected, so that an intensity of an optical signal received by a light sensor of the information receiving device is greater than or equal to a start-up light intensity of the light sensor, thereby the light sensor can sense the optical signal at a rated resolution, the optical signal includes an optical communication information.

In some implementations, in response to the light emitting element including a single light emitting part, adjusting the light emitting mode of the light emitting element of the information transmitting device according to the distance detected includes: adjusting a brightness of the light emitting part of the information transmitting device according to the distance detected.

In some implementations, in response to the light emitting element including a plurality of light emitting parts, adjusting the light emitting mode of the light emitting element of the information transmitting device according to the distance detected includes: judging whether the distance detected is greater than a threshold within a stable light intensity sensing range of the light sensor, the stable light intensity sensing range indicates a distance range in which the light sensor can sense a light intensity stably; in response to the distance detected being greater than the threshold, adjusting a brightness of each of the light emitting parts and/or a number of light emitting parts emitting light among the plurality of light emitting parts according to the distance detected, so that the intensity of the optical signal received by the light sensor is greater than or equal to, but approaches the start-up light intensity of the light sensor; and in response to the distance detected being less than or equal to the threshold, controlling the plurality of light emitting parts issue the optical signal in a time-divisional mode.

In some implementations, adjusting the light emitting mode of the light emitting element of the information transmitting device according to the distance detected includes: acquiring an optical communication data frame including a data body and a distance estimating bit, the distance estimating bit indicating the distance detected; retrieving the light emitting mode from a list according to the distance estimating bit; and driving the light emitting element to issue the optical signal including the data body in the light emitting mode retrieved, according to the light emitting mode retrieved and the data body.

In some implementations, the optical communication method further includes: before the optical communication between the information transmitting device and the information receiving device, positioning the information transmitting device so that the light emitting element of the information transmitting device and the light sensor of the information receiving device are corresponding one by one.

An embodiment of the present disclosure provides an optical communication system, including the information transmitting device as above, and the information receiving device.

In some implementations, the light emitting element of the information transmitting device and the light sensor of the information receiving device are corresponding one by one.

DESCRIPTION OF DRAWINGS

In accompanying drawings drawn not necessarily proportionally, similar reference signs indicate similar components in different drawings. The accompanying drawings show various embodiments by means of examples rather than limitations, and are used together with specification and claims for illustrating the disclosed embodiments. In due course, reference signs the same with each other are used to refer to parts the same with each other in all the drawings. The illustrated embodiments are illustrative and are not intended as exhaustive or exclusive embodiments of devices or methods of the present disclosure.

DESCRIPTION OF EMBODIMENTS

Figure 1:
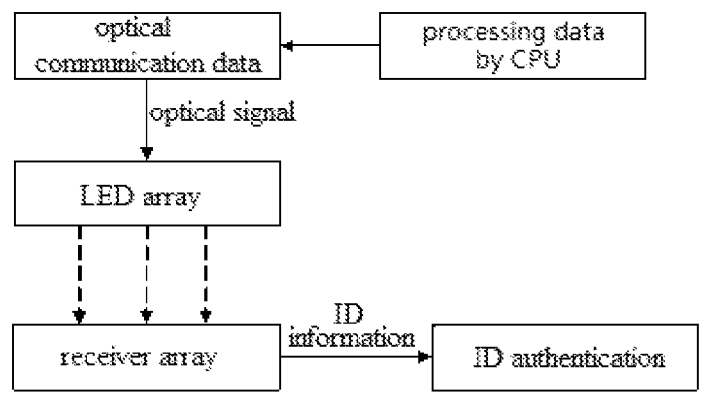
FIG. 1 shows an overview diagram of an optical communication system in an embodiment of the present disclosure.

Technical solutions and features of the present disclosure are described below by referring to the drawings. From descriptions of implementations of embodiments as non-limiting examples given below with reference to the drawings, the technical solutions and the features of the present disclosure will be clear.

It should be noted that, as required, the features of the embodiments disclosed below may be combined arbitrarily, and in full text of the specification, reference signs the same with each other refer to components the same with each other, and unnecessary duplicate descriptions are omitted. In addition, in the embodiments, a component appearing in singular form does not preclude that the component may appear in multiple (plural) forms.

The embodiments of the present disclosure are described in detail below. In the technical solutions of the embodiments of the present disclosure, a distance sensor is provided in an information transmitting device to detect a distance from the information transmitting device to an information receiving device, so that a light emitting mode of a light emitting element in the information transmitting device is relating to the distance detected, compared to related technology, since the light emitting mode of the light emitting element in the technical solutions of the embodiments of the present disclosure can be adjusted and controlled according to the distance detected, a power consumption of the light emitting element is expected to be lowered, thus a power consumption of the information transmitting device is expected to be lowered, meanwhile it can ensure that a light sensor of the information receiving device can clearly identify an optical signal received, an optical communication is achieved.

FIG. 1 shows an overview diagram of an optical communication procedure (an authentication procedure is taken as an example) of an optical communication system. An information transmitting device and an information receiving device share a same optical communication protocol. In a case where the information transmitting device transmits, for example, an optical signal for an identification authentication, the optical signal includes identification (ID) information, the information receiving device identifies the ID information from the optical signal received and authenticates a correctness of the ID information, and in response to the ID information being correct, the authentication is successful. As shown in FIG. 1, the information transmitting device can process data by a central processing unit (CPU) to generate optical communication data, the optical communication data may include the ID information, then an LED array may be driven to issue a corresponding optical signal, the information receiving device is provided with an ID database therein, and the information receiving device includes a receiver array, and the information receiving device decodes and analyzes the optical signal received by the receiver array to obtain the ID information, and then performs an authentication on the ID information based on the ID database.

Figure 2:
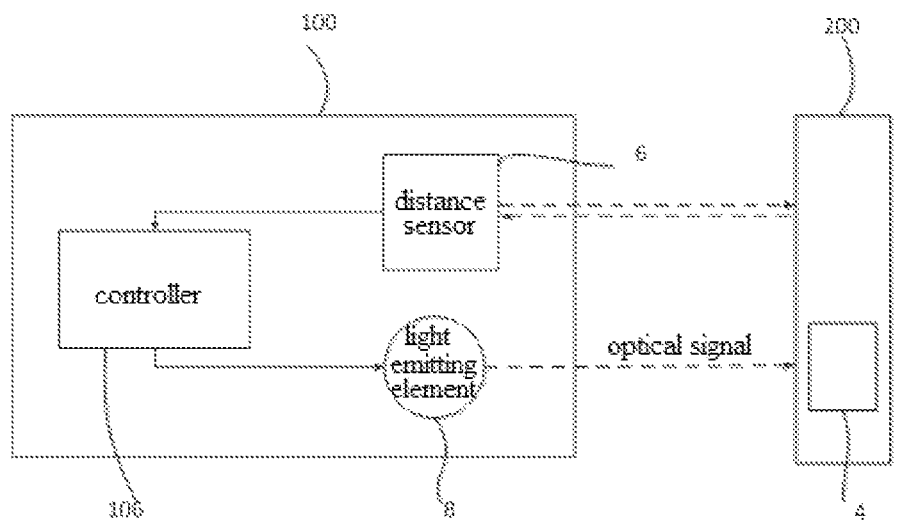
FIG. 2 shows a structural diagram of an optical communication system in an embodiment of the present disclosure.

FIG. 2 shows a structural diagram of an optical communication system in an embodiment of the present disclosure. As shown in FIG. 2, the optical communication system includes an information receiving device 200 and an information transmitting device 100. Since an optical communication may be used in various application scenarios, the information receiving device 200 and the information transmitting device 100 may vary according to the application scenarios. For example, in an authentication scenario, the information transmitting device 100 may be a device to be authenticated, such as a mobile device and an intelligent appliance, and the information receiving device 200 may be an authentication server.

In the embodiment of the present disclosure, the information transmitting device 100 includes a distance sensor 6, a light emitting element 8 and a controller 106. The information transmitting device 100 may further include a power supply and so on.

The distance sensor 6 is configured to detect a distance from the information transmitting device 100 to the information receiving device 200. The distance sensor 6 includes, for example, but is not limited to, an optical displacement sensor, a linear proximity sensor, an ultrasonic displacement sensor and so on. In a case where the information transmitting device 100 is a mobile device such as a mobile phone, the distance sensor 6 may be a distance sensor already equipped for the mobile device such as the mobile phone, thereby no additional modification of the mobile device is required.

The light emitting element 8 is configured to issue an optical signal to the information receiving device 200, and the optical signal includes optical communication information. For example, for identification authentication, an optical signal for identification authentication is issued, and the optical signal for identification authentication may include identification (ID) information of the information transmitting device 100.

The controller 106 is electrically coupled to the distance sensor 6 and the light emitting element 8 respectively, and is configured to adjust a light emitting mode of the light emitting element 8 according to the distance detected by the distance sensor 6, so that an intensity of the optical signal received by a light sensor 4 of the information receiving device 200 is greater than or equal to a start-up light intensity of the light sensor 4.

Herein, the term "light emitting mode" refers to a way in which the light emitting element emits light, includes at least one or a combination of a brightness of light emitted by the light emitting element, the number of light emitting parts emitting light in the light emitting element, a cooperative operation mode (e.g., time divisional light emitting mode, coordination operation mode of light emitting parts at different spatial locations, etc.) of light emitting parts of the light emitting element in time and space domains, the term "start-up light intensity" refers to an inherent parameter determined by inherent characteristics of the light sensor, indicates that the light sensor can sense the optical signal at rated resolution in response to the intensity of the optical signal received by the light sensor being greater than or equal to the start-up light intensity, and the term "stable light intensity sensing range" refers to a distance range in which the light sensor can sense a light intensity stably.

In the embodiment of the present disclosure, the distance sensor 6 of the information transmitting device 100 detects the distance between the information transmitting device 100 and the information receiving device 200, so that the light emitting mode of the light emitting element 8 is relating to the distance detected, compared to related technology, since the light emitting mode of the light emitting element 8 in the technical solution of the embodiment of the present disclosure can be adjusted and controlled according to the distance detected, a power consumption of the light emitting element 8 is expected to be lowered, thus a power consumption of the information transmitting device 100 is expected to be lowered, meanwhile it can ensure that the light sensor 4 of the information receiving device 200 can clearly identify the optical signal received, an optical communication is achieved.

Figure 3:
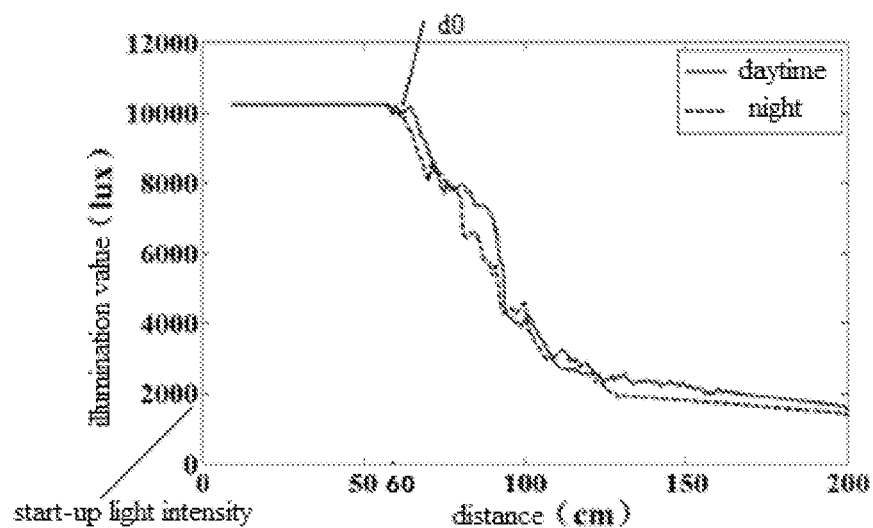
FIG. 3 illustrates a relationship between an illumination value of a light sensor and a distance from the light sensor to a light emitting element.

A principle of controlling for the light emitting mode of the light emitting element 8 will be described in detail below. FIG. 3 shows an inherent characteristic of a light sensor as an example, and in particular, shows relationships of illumination values of the light sensor in daytime and at night and a distance (e.g., from the light sensor to the light emitting element 8 of the information transmitting device 100). As shown in FIG. 3, at a distance closer to the light emitting element 8, for example, at the distance from the light emitting element 8 in a range from 0 to 60 cm (which may be different for different types of light sensors), the light sensor can sense a relative great light intensity stably, that is, the illumination value of the light sensor is stable and relatively great, and at a distance farther away from the light emitting element 8, for example, at the distance from the light emitting element 8 beyond 60 cm, the light intensity sensed by the light sensor is lowered with an increasing of the distance, that is, the illumination value of the light sensor is lowered with the increasing of the distance. Further, from experiments, both in daytime and at night, as long as the light intensity sensed reaches 2000 lux, the light sensor can sense the optical signal at rated resolution, and the light intensity sensed being increased further would not result in a significant influence on the resolution of the light sensor, thus 2000 lux may be determined as the start-up light intensity of the light sensor. Since in a case where the distance from the light sensor to the light emitting element is in a range from 0 to 60 cm, the light sensor can sense an enough light intensity (greater than or equal to the start-up light intensity of the light sensor) stably, the range from 0 to 60 cm may be determined as the "stable light intensity sensing range" of the light sensor.

Since the start-up light intensity is an inherent characteristic of the light sensor, thus may be determined according to a specific type and design specification of the light sensor. The information transmitting device 100 can acquire inherent characteristics (including the start-up light intensity) of the light sensor in various ways, and can optionally store the inherent characteristics of the light sensor acquired in a storage for subsequent usage.

In some implementations, the light emitting element 8 of the information transmitting device 100 includes a single light emitting part, for example, a single LED. The controller 106 controls the brightness of the light emitting element 8 according to the distance detected, so that the light intensity of the optical signal received by the light sensor is greater than or equal to, but approaches the start-up light intensity of the light sensor.

According to the inherent characteristic of the light sensor, as long as the light intensity sensed by the light sensor reaches the start-up light intensity of the light sensor, the light sensor can clearly identify the optical signal received, thus the brightness of the light emitting element 8 needs not to be too high, and can be adjusted according to the distance detected, in such way, it can ensure a normal optical communication, and the power consumption of the light emitting element 8 can be lowered as much as possible, resulting in that the power consumption of the information transmitting device 100 including the light emitting element 8 can be lowered.

In some implementations, the light emitting element 8 of the information transmitting device 100 may include a plurality of light emitting parts.

Figure 4A:
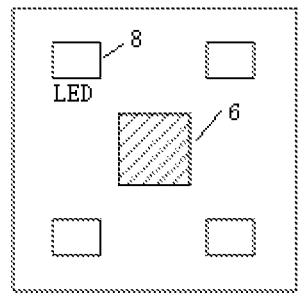
FIG. 4a shows a diagram of an arrangement example of an LED array and a distance sensor in an information transmitting device of an embodiment of the present disclosure.
Figure 4B:
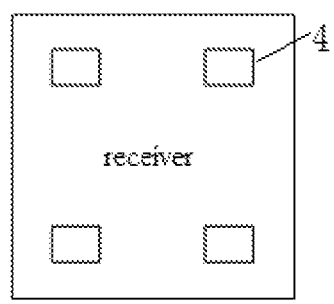
FIG. 4b shows a diagram of an arrangement example of light sensors in an information receiving device as a receiving terminal.

As shown in FIG. 4*a*, the light emitting element 8 may include LEDs, and the LEDs are arranged in an LED array. The LED array shown in FIG. 4*a* includes four LEDs, but ordinary skilled persons in the art should understand that, the number of LEDs is not limited to the specific example shown in the figure. FIG. 4*b* shows an example of arrangement of light sensors 4 in a receiver (i.e., the information receiving device 200) respectively corresponding to the LEDs of the information transmitting device 100.

Figure 4C:
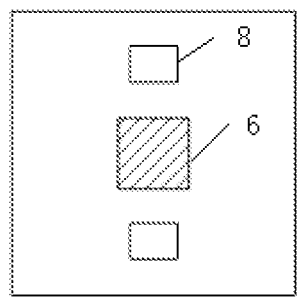
FIGS. 4c and 4d show diagrams of other arrangement examples of an LED array and a distance sensor in an information transmitting device respectively.
Figure 4D:
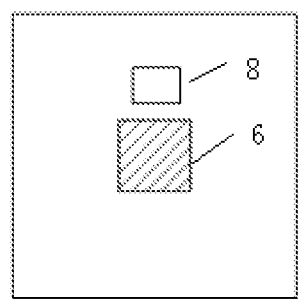

An example of arrangement of an ultrasonic sensor 6 as the distance sensor and LEDs 8 is shown in FIG. 4*a*, the LEDs 8 are arranged evenly around and near the ultrasonic sensor 6, which facilitates the distance detected by the ultrasonic sensor 6 actually reflecting distances between the LEDs 8 and the light sensor. It should be understood that, in addition to that the light emitting element 8 can include more than one LED, the distance sensor may include more than one ultrasonic sensor 6 as required. The arrangement (e.g., relationship of positions) of the ultrasonic sensor 6 and the LEDs 8 may also be modified as required. FIGS. 4*c* and 4*d* show other examples of arrangements of the LED array and the distance sensor (ultrasonic sensor) 6 in the information transmitting device 100 respectively. FIG. 4*c* shows that the LED array includes two LEDs 8 evenly arranged on both sides (upper side and lower side) of the ultrasonic sensor 6. FIG. 4*d* shows only one LED 8 arranged near the ultrasonic sensor 6.

In some implementation, the LEDs 8 are arranged corresponding to the arrangement of positions of light sensors 4. That is, the light emitting element 8 of the information transmitting device 100 and the light sensor(s) 4 of the information receiving device 200 are arranged in a one-to-one correspondence.

In some implementations, the controller 106 may determine a light emitting mode of LEDs according to whether the distance detected is greater than a threshold d0. The threshold d0 is in the stable light intensity sensing range of the light sensor, and indicates that in a case where the distance detected is equal to or below the threshold d0, the light sensor can stably sense an enough light intensity. The threshold d0 may be set according to the inherent characteristic of the light sensor in the information receiving device 200. As shown in FIG. 3, in a case where the distance from the light sensor to the light emitting element is about 60 cm or below, the light sensor can stably sense the enough light intensity, thus the threshold d0 may be 60 cm or below.

In some implementations, in a case where the distance d detected is greater than the threshold d0, the controller 106 may adjust the brightness of each of the LEDs so that the light intensity of the optical signal received by the light sensor corresponding each of the LEDs is greater than or equal to, but approaches the start-up light intensity of the light sensor.

In some implementations, in a case where the distance d detected is greater than the threshold d0, the controller 106 may adjust the number of LEDs emitting light in the light emitting element 8, for example, when the LED array includes four LEDs, only a portion of the LEDs may emit light, so that the light intensity of the optical signal received by the light sensor corresponding to each LED emitting light is greater than or equal to, but approaches the start-up light intensity of the light sensor.

The implementations as above may be combined, that is, the controller 106 may adjust the number of light emitting parts of the light emitting element and the brightness of each light emitting part of the light emitting element.

In such way, the light emitting mode of the light emitting element may be adjusted more fine-grained, thus the power consumption of the light emitting element is lowered and the optical communication is achieved.

In some implementations, in a case where the distance d detected is less than or equal to the threshold d0, the controller 106 may control light emitting parts of the light emitting element 8 to emit light in a time divisional mode. Herein, the time divisional mode indicates that time slots during which the light emitting parts of the light emitting element 8 emit light (i.e., issue fragments of the optical signal) do not overlap with each other, and a sum of the fragments issued by the light emitting parts of the light emitting element 8 in each light emitting period forms an entire optical signal. That is, the entire optical signal in each light emitting period are divided into a plurality of fragments, and the light emitting parts of the light emitting element 8 issue respective ones of the fragments in different time slots of the light emitting period respectively.

The meaning of the threshold d0 has been explained above. That is, the threshold d0 indicates that in a case where the distance detected d is equal to or below the threshold d0, the light sensor can stably sense an enough light intensity. In such case, the optical signal issued by the light emitting element is easily to be sensed by the light sensor and the light emitting element does not need to emit light with too high intensity. That is to say, in a case where the optical signal issued by the light emitting element (e.g., LED(s)) is easily to be sensed by the light sensor, the optical signal may be issued in the time divisional mode. For example, in a case where the light emitting element 8 includes four LEDs, with the time divisional mode, an operation time of each of the LEDs is reduced, and a deterioration of each of the LEDs is reduced, thus a service life of each of the LEDs is prolonged.

Certainly, in a case where the light emitting element of the information transmitting device includes an LED array, before the light emitting mode of the light emitting element of the information transmitting device is adjusted and controlled, LEDs in the LED array may emit light simultaneously, and after estimating the distance detected, the LEDs in the LED array emit light, for example in the time divisional mode.

In some implementations, the controller 106 may include a driving circuit and a micro-controller.

The driving circuit is configured to drive the light emitting element 8 to emit light, for example, in a case where the light emitting element 8 includes an LED(s), the driving circuit is an LED driving circuit.

Figure 5:
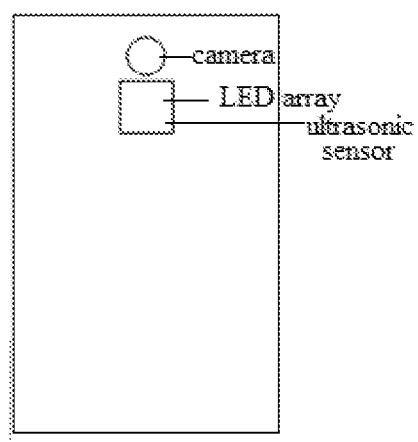
FIG. 5 shows a diagram of arrangement positions of an LED array and an ultrasonic sensor in a mobile device as an information transmitting device of an embodiment of the present disclosure.
Figure 6:
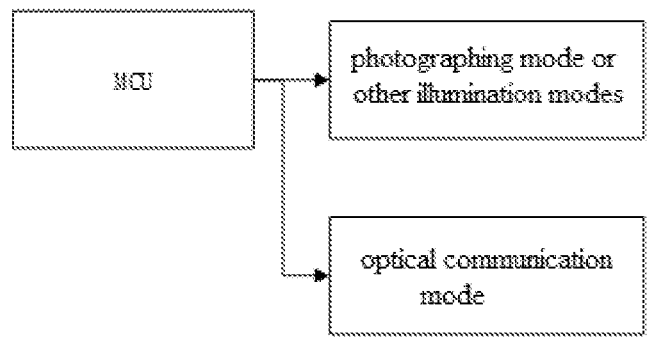
FIG. 6 shows a diagram for illustrating controlling of a controller of an information transmitting device in an embodiment of the present disclosure.

The micro-controller is configured to transmit a control signal to the driving circuit to adjust and control the light emitting element. The micro-controller may be a micro-controlling chip such as MCU. For example, in a case where the information transmitting device 100 is a mobile device such as a mobile phone and a tablet computer, the micro-controller may be implemented by a processor of the mobile device. In such case, the light emitting element 8 may include a flashing light of the mobile device. Alternatively, the light emitting element 8 may include any other light emitting element other than the flashing light of the mobile device. FIG. 5 shows a diagram of arrangement of positions of an LED array and an ultrasonic sensor in the mobile device. It can be seen that, the LED array and the ultrasonic sensor are arranged near a camera of the mobile device. FIG. 6 shows that an LED included in the flashing light of the mobile device may be used in a photographing mode or other illumination modes as required, or may be used in an optical communication mode related by the present disclosure, for example, identification authentication, data transporting and so on. The mobile device may include storage for storing data such as the start-up light intensity of the light sensor, the threshold d0.

Figure 7:
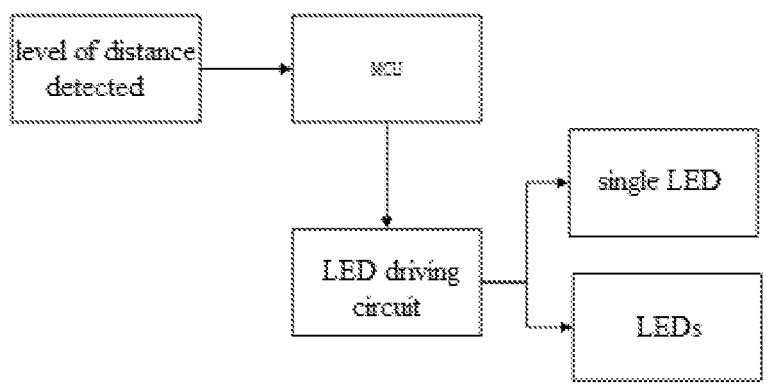
FIG. 7 shows a diagram for illustrating controlling of a controller in an embodiment of the present disclosure.

FIG. 7 shows a diagram for illustrating controlling of a controller in an embodiment of the present disclosure. As shown in FIG. 7, the MCU of the controller may transmit a control signal to the LED driving circuit according to a level of the distance detected, and the LED driving circuit drives a single or more than one LED(s) to emit light according to the control signal received.

In addition, although it is mentioned that the mobile device such as the mobile phone and the tablet computer may be used as the information transmitting device, an intelligent key (e.g., a specialized equipment equipped with a micro-controller and an LED, and optically communicates with a door lock to perform unlocking) may also be the information transmitting device of the embodiment of the present disclosure.

Figure 8:
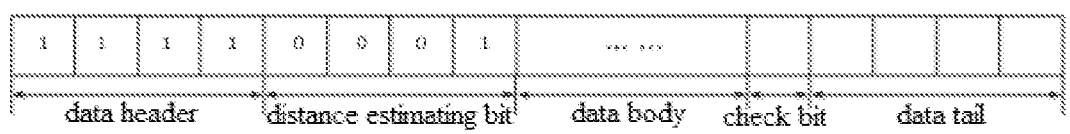
FIG. 8 shows a structural diagram of an optical communication data frame acquired by a controller of an information transmitting device in an embodiment of the present disclosure.

In some implementations, the micro-controller included in the controller of the information transmitting device may be configured to acquire a data frame including a data body and a distance estimating bit (as shown in FIG. 8), the distance estimating bit indicates the distance detected by the distance sensor in the information transmitting device, and the micro-controller may retrieve a light emitting mode according to the distance estimating bit and generate a control signal according to the light emitting mode retrieved and the data body, so that the optical signal issued by the light emitting element of the information transmitting device includes the data body.

In an application scenario for authentication, the data body may include identification (ID) information of the information transmitting device.

In some implementations, the distance d detected may be transformed into various levels to be filled in the distance estimating bit, and different light emitting modes are determined according to different levels respectively. For example, in a case where the distance d detected is greater than the threshold d0, the level of the distance d is increased by one for each additional predetermined distance. Specifically, for example, in a case where the distance d is greater than the threshold d0 and is at a level d1, one LED may be used for emitting light, in a case where the distance d is at a level d2 greater than the level d1 (i.e., the level d2 indicates a distance greater than that indicated by the level d1, hereafter, the greater the sequence number of the level is, the greater the distance indicated by the level is), two LEDs may be used for emitting light, in a case where the distance d detected is at a level d3 greater than the level d2, three LEDs may be used for emitting light, and in a case where the distance d detected is at a level d4 greater than d3, four LEDs (i.e., all LEDs) may be used for emitting light. The relationship between the levels of the distance detected and the light emitting mode of the light emitting element is only an example, but is not intended to limit the scope of the present disclosure. Other examples in which the light emitting mode is determined according to the level of the distance detected will be described later.

In some implementations, as shown in FIG. 8, the optical communication data frame acquired by the controller 106 has a format including a data header, a distance estimating bit, a data body, a check bit and a data tail. In the example shown in FIG. 8, four bits after the data header of the data frame are used for the distance estimating bit, thus the distance detected may be at any level among 1 to 16 levels, and the light emitting element emits light in different light emitting modes according to different levels of the distance detected. For example, the relationship between the distances at the 16 levels and the light emitting modes (including the number of light emitting parts of the light emitting element and the light intensity of each light emitting part of the light emitting element) of the light emitting element may be stored as a list in the information transmitting device 100. Specifically, the intensity of each light emitting part of the light emitting element may be pre-determined by experiment or simulation to be stored in the list, and must satisfy that, under a corresponding distance detected, the light intensity of the optical signal received by the respective light sensor is greater than or equal to, but approaches the start-up light intensity of the light sensor. Then, as required, the list can be retrieved directly to determine which light emitting mode should be used by the light emitting element for a particular level of the distance detected. Specifically, for example, assuming that distances at levels 1 to 3 are short distances, in a case where the distance detected is at any of the levels 1 to 3, the light emitting element emits light in the time divisional mode, and in a case where the distance detected is at the level 1, the light intensity of each light emitting part of the light emitting element is a predefined value A1, in a case where the distance detected is at the level 2, the light intensity of each light emitting part of the light emitting element is a predefined value A2, in a case where the distance detected is at the level 3, the light intensity of each light emitting part of the light emitting element is a predefined value A3 (e.g., A1, A2 and A3 may be obtained by retrieving the list); assuming that distances at levels 4 or above are long distances, in a case where the distance detected is at any of levels 4-6, two light emitting parts of the light emitting element may be used for emitting light, and light intensities of each light emitting part at respective levels 4-6 may be predefined values B1, B2 and B3 (obtained by retrieving the list) respectively; in a case where the distance detected is at any of levels 7-9, three light emitting parts of the light emitting element may be used for emitting light, and light intensities of each light emitting part at respective levels 7-9 may be predefined values C1, C2 and C3 (obtained by retrieving the list) respectively; and so forth. The relationship between the levels of distances detected and the light emitting modes of the light emitting element is only an example, and is not intended to limit the present disclosure.

It should be noted that, for ordinary skilled persons in the art, the relationship between the levels of distances detected and the light emitting modes of the light emitting element, and the levels of distances detected may be adjusted as required without departing from the scope of the present disclosure.

Figure 9:
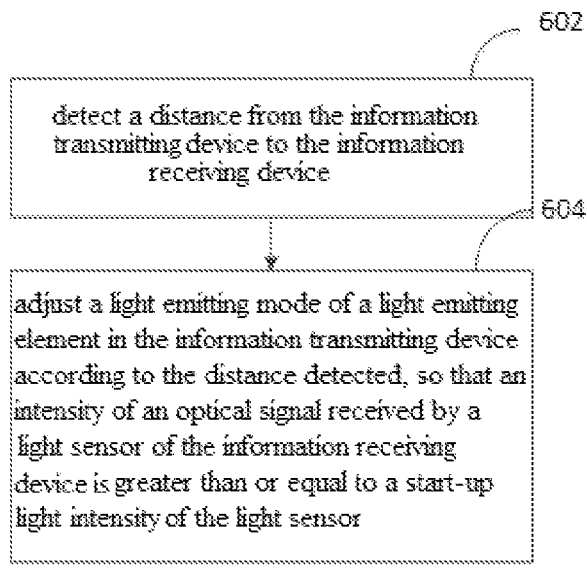
FIG. 9 shows a flowchart of an optical communication method in an embodiment of the present disclosure.

FIG. 9 shows a flowchart of an optical communication method in an embodiment of the present disclosure, and the optical communication method is suitable for an optical communication authentication from an information transmitting device to an information receiving device. As shown in FIG. 9, the optical communication method includes following steps 602 and 604.

At step 602, a distance from the information transmitting device to the information receiving device is detected.

At step 604, a light emitting mode of a light emitting element in the information transmitting device is adjusted according to the distance detected, so that an intensity of an optical signal received by a light sensor of the information receiving device is greater than or equal to a start-up light intensity of the light sensor, the optical signal includes an optical communication information.

In some implementations, in a case where the optical communication method is used for identification authentication, the optical communication information issued by the information transmitting device includes identification information.

In some implementations, in a case where the light emitting element includes a single light emitting part, a brightness of the light emitting element may be controlled according to the distance detected so that the intensity of the optical signal received by the light sensor is greater than or equal to, but approaches the start-up light intensity of the light sensor.

In some implementations, in a case where the light emitting element includes a plurality of light emitting parts, adjusting the light emitting mode of the light emitting element of the information transmitting device according to the distance detected includes: judging whether the distance detected is greater than a threshold within a stable light intensity sensing range of the light sensor; in response to the distance detected being greater than the threshold, adjusting a brightness of each light emitting part and/or a number of light emitting parts emitting light among the plurality of light emitting parts according to the distance detected, so that the intensity of the optical signal received by the light sensor is greater than or equal to, but approaches the start-up light intensity of the light sensor; and in response to the distance detected being less than or equal to the threshold, controlling the plurality of light emitting parts issue the optical signal in a time divisional mode.

Specifically, whether the distance d detected is greater than a threshold d0 may be judged, the threshold d0 may be determined according to light sensing characteristics of the light sensor, and in a case where the distance d detected is equal to or below the threshold d0, the light sensor can stably sense an enough light intensity.

In some implementations, in a case where the distance d detected is greater than the threshold d0, the optical communication method may include: adjusting a brightness of each light emitting part and/or a number of light emitting parts of the light emitting element emitting light according to the distance d detected, so that the intensity of the optical signal received by each respective light sensor corresponding to the light emitting part of the light emitting element is greater than or equal to, but approaches the start-up light intensity of the light sensor.

For example, in a case where the light emitting element is an LED array and the LED array includes four LEDs, a portion of the LEDs may emit light and the brightness of each LED may be adjusted so that the intensity of the optical signal received by the respective light sensor is greater than or equal to the start-up light intensity of the light sensor.

In some implementations, adjusting the light emitting mode of the light emitting element of the information transmitting device according to the distance detected includes: acquiring an optical communication data frame including a data body and a distance estimating bit, the distance estimating bit indicating the distance detected; retrieving the light emitting mode from a list according to the distance estimating bit; and driving the light emitting element according to the light emitting mode retrieved and the data body so that the light emitting element issues an optical signal including the data body in the light emitting mode retrieved.

For example, a format of the optical communication data frame may be set as described above, and the distance d detected may be transformed into various levels to be filled in the distance estimating bit of the optical communication data frame, then the light emitting element may emit light in the light emitting mode determined according to the level of the distance d.

Figure 10:
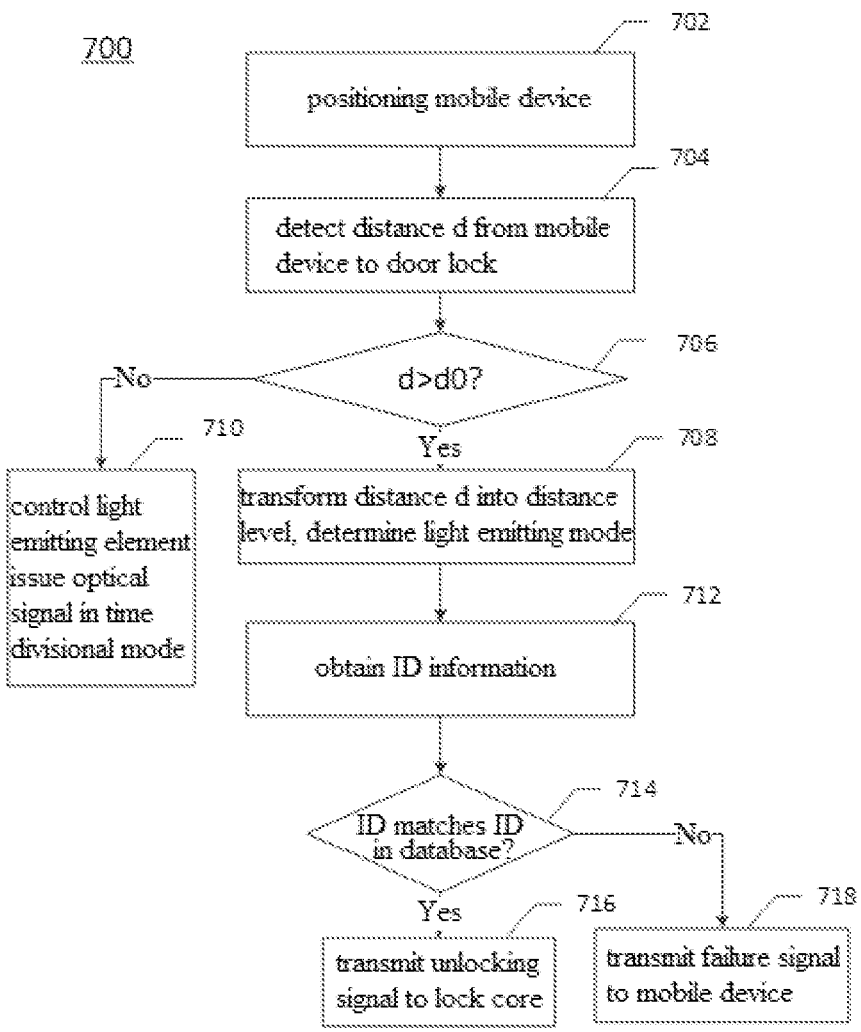
FIG. 10 shows another flowchart of an optical communication method in an embodiment of the present disclosure.

FIG. 10 shows a flowchart of an example procedure of the optical communication method in an embodiment of the present disclosure. Assuming that the information transmitting device is a mobile device including an LED array as the light emitting element, and the information receiving device is a door lock including a plurality of light sensors corresponding to LEDs of the LED array respectively. The mobile device transmits an optical communication data including ID information through the light emitting element to the light sensors of the door lock, the door lock identifies the ID information from the optical communication data received and authenticates the ID information, if the authentication is successful, a lock core of the door lock is driven to unlock.

As shown in FIG. 10, the optical communication method 700 includes following steps 702 through 718.

At step 702, the mobile device is positioned so that the light emitting parts of the light emitting element and the light sensors of the door lock are corresponding one by one.

At step 704, a distance d from the mobile device to the door lock is detected.

At step 706, whether the distance d detected is greater than the threshold d0 is judged, and in a case where the distance d detected is greater than the threshold d0, the method proceeds to step 708, otherwise, proceeds to step 710.

At step 708, the distance d detected is transformed into a distance level, and the light emitting mode of the light emitting element is determined according to the distance level.

Specifically, the number of light emitting parts of the light emitting element may be determined and the intensity of each light emitting part of the light emitting element may be determined.

At step 710, the light emitting element is controlled to issue an optical signal in the time divisional mode.

At step 712, the door lock resolves the optical signal received from the light emitting element to obtain the ID information.

At step 714, the ID information obtained by the door clock and the ID information stored in a database are matched (i.e., the authentication is performed), if it is successful, the method proceeds to step 716, otherwise, a failure signal is transmitted to the mobile device at step 718.

At step 716, an unlocking driving signal is transmitted to the lock core.

The embodiment of the optical communication method described above is only an example, steps and/or processes, and a sequence of the steps and/or the processes in the embodiment are not intended to limit the present disclosure, some of the steps may be not necessary, for example, the step 702 for positioning the mobile device may be omitted, the effect of omitting this step on the technical solution of the present disclosure is only in terms of accuracy, which would not affect an implementation of the technical solution of the present disclosure. In addition, the number of light emitting parts of the light emitting element at the transmitting terminal may be different from the number of light sensors at the receiving terminal. For example, in a case where the number of light emitting parts of the light emitting element is greater than the number of light sensors, the controller may stop using the redundant light emitting parts of the light emitting element. Furthermore, at step 708, it is not necessary to transform the distance d detected to the distance level to determine the light emitting mode according to the distance level, for example, in the aforementioned device embodiment, the method in which the light emitting mode is determined directly according to the distance d detected (including that the number of light emitting parts emitting light in the light emitting element is determined and the light intensity of each light emitting part emitting light is determined) has been described.

Where the method of the embodiment of the present disclosure is not described in detail, the description of the device embodiment of the present disclosure may be referred to.

Although specific embodiments of an optical communication system (method) are described with an example of the authentication procedure, it should be understood by those skilled in the art that the technical solution of the present disclosure can be applied to other application examples of optical communication, and the description of the specific embodiments should not be regarded as a limitation to the present disclosure.

The controller in the present disclosure may be implemented by software, hardware or a combination thereof, and the hardware may be, for example, a processor, an integrated circuit and so on.

It should be understood that, the above embodiments are merely exemplary embodiments for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. An information transmitting device for optical communication, comprising:
    a distance sensor, configured to detect a distance from the information transmitting device to an information receiving device;
    a light emitting element, configured to issue an optical signal to the information receiving device, the optical signal comprising optical communication information;
    a controller electrically coupled to the distance sensor and the light emitting element respectively, configured to adjust a light emitting mode of the light emitting element according to the distance detected, so that an intensity of the optical signal received by a light sensor of the information receiving device is greater than or equal to a start-up light intensity of the light sensor, thereby the light sensor can sense the optical signal at a rated resolution,
    wherein the controller comprises a driving circuit configured to drive the light emitting element to emit light and a micro-controller configured to transmit a control signal to the driving circuit, and wherein the micro-controller is configured to:
    acquire an optical communication data frame comprising a data body and a distance estimating bit, the distance estimating bit indicating the distance detected;
    retrieve the light emitting mode from a list according to the distance estimating bit; and
    generate the control signal according to the light emitting mode retrieved and the data body so that the optical signal issued by the light emitting element comprises the data body.

2. The information transmitting device of claim 1, wherein the light emitting element comprises a single light emitting part, and adjusting the light emitting mode of the light emitting element comprises adjusting a brightness of the light emitting part.

3. The information transmitting device of claim 1, wherein the light emitting element comprises a plurality of light emitting parts, and wherein the controller is configured to:
    judge whether the distance detected is greater than a threshold within a stable light intensity sensing range of the light sensor, the stable light intensity sensing range indicating a distance range in which the light sensor can sense a light intensity stably;
    in response to the distance detected being greater than the threshold, adjust a brightness of each of the light emitting parts and/or a number of light emitting parts emitting light among the plurality of light emitting parts according to the distance detected, so that the intensity of the optical signal received by the light sensor is not less than, but approaches the start-up light intensity of the light sensor, and
    in response to the distance detected being less than or equal to the threshold, control the plurality of light emitting parts to issue the optical signal in a time-divisional mode.

4. The information transmitting device of claim 1, wherein the data body comprises identification information of the information transmitting device.

5. The information transmitting device of claim 1, wherein the light emitting element comprises a light emitting diode.

6. The information transmitting device of claim 1, wherein the light emitting element and the light sensor corresponding to each other.

7. The information transmitting device of claim 1, comprising a mobile device, and wherein the light emitting element comprises a flashing light of the mobile device.

8. An optical communication method for optical communication between an information transmitting device and an information receiving device, the method comprising:
    detecting a distance from the information transmitting device to the information receiving device;

adjusting a light emitting mode of a light emitting element of the information transmitting device according the distance detected, so that an intensity of an optical signal received by a light sensor of the information receiving device is greater than or equal to a start-up light intensity of the light sensor, thereby the light sensor can sense the optical signal at a rated resolution, wherein the optical signal comprises optical communication information, wherein adjusting the light emitting mode of the light emitting element of the information transmitting device according to the distance detected comprises:

acquiring an optical communication dam frame comprising a data body and a distance estimating bit, the distance estimating bit indicating the distance detected;

retrieving the light emitting mode from a list according to the distance estimating bit; and driving the light emitting element to issue an optical signal comprising the data body in the light emitting mode retrieved, according to the light entitling mode retrieved and the data body.

9. The optical communication method of claim 8, wherein in response to the light emitting element comprising a single light emitting part, adjusting the light emitting mode of the light emitting element of the information transmitting device according to the distance detected by:

adjusting a brightness of the light emitting part of the information transmitting device according to the distance detected.

10. The optical communication method of claim 8, wherein in response to the light emitting element comprising a plurality of light emitting parts, adjusting the light emitting mode of the light emitting element of the information transmitting device according to the distance detected by:

judging whether the distance detected is greater than a threshold within a stable light intensity sensing range of the light sensor, the stable light intensity sensing range indicating a distance range in which the light sensor can sense a light intensity stably;

in response to the distance detected being greater than the threshold, adjusting a brightness of each of the light emitting parts and/or a number of light emitting parts emitting light among the plurality of light emitting parts according to the distance detected, so that the intensity of the optical signal received by the light sensor is not less than, but approaches the start-up light intensity of the light sensor, and in response to the distance detected being less than or equal to the threshold, controlling the plurality of light emitting parts to issue the optical signal in a time-divisional mode.

11. The optical communication method of claim 8, further comprising:

before the optical communication between the information transmitting device and the information receiving device, positioning the information transmitting device so that the light emitting element of the information transmitting device and the light sensor of the information receiving device correspond to each other.

12. An optical communication system, comprising:

the information transmitting device of claim 1; and the information receiving device, wherein the tight emitting element of the information transmitting device and the light sensor of the information receiving device correspond to each other.

\* \* \* \* \*